March 12, 1935.  H. F. PARKER ET AL  1,994,434
BRAKE
Filed May 21, 1930  3 Sheets-Sheet 1

INVENTORS
Bryan E. House
Humphrey F. Parker
BY
R. W. McConkey
ATTORNEY.

March 12, 1935.  H. F. PARKER ET AL  1,994,434
BRAKE
Filed May 21, 1930   3 Sheets-Sheet 2

INVENTORS
Bryan E. House
Humphrey F. Parker
BY
ATTORNEY

March 12, 1935.  H. F. PARKER ET AL  1,994,434
BRAKE
Filed May 21, 1930  3 Sheets-Sheet 3
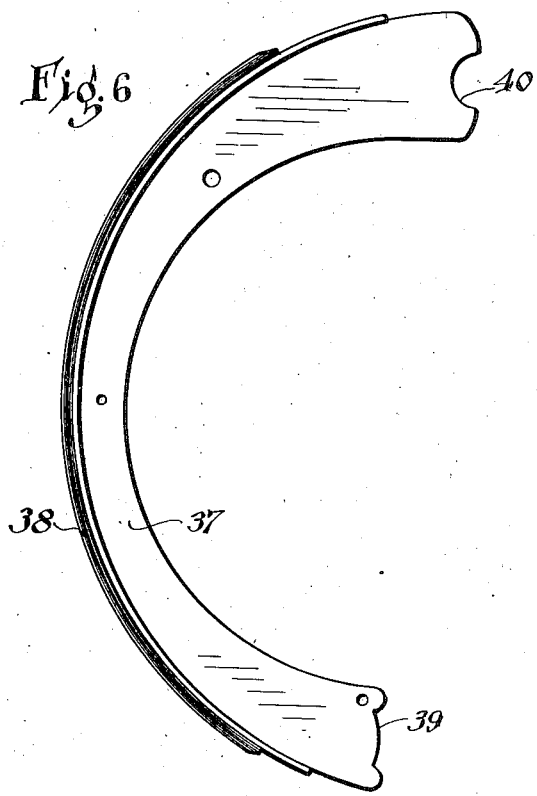
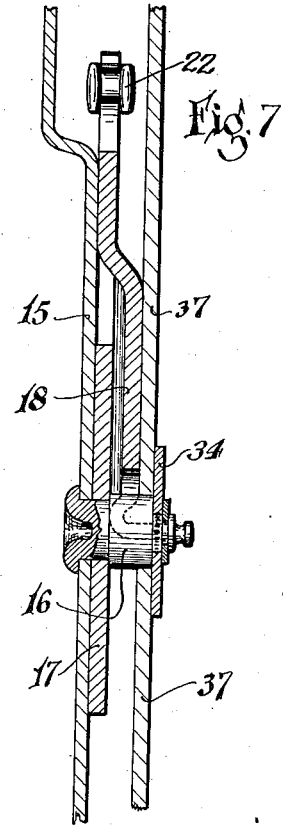
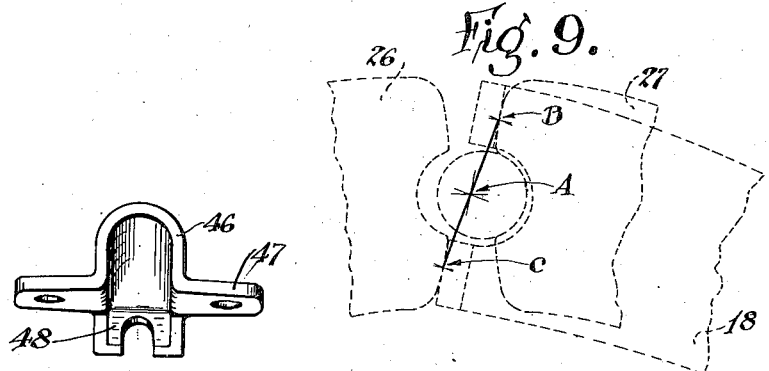
INVENTORS
Bryan E. House
Humphrey F. Parker
BY
M. W. McConkey
ATTORNEY Patented Mar. 12, 1935

1,994,434

UNITED STATES PATENT OFFICE 1,994,434

BRAKE

Humphrey F. Parker and Bryan E. House, South Bend, Ind., assignors to Bendix Brake Company, South Bend, Ind., a corporation of Illinois Application May 21, 1930, Serial No. 454,250

33 Claims. (Cl. 188—78)

This invention relates to brakes and more particularly to internal expanding brakes.

Generally, brakes for stopping motor vehicles comprise a rotating drum fixed to a wheel or propeller shaft and a stationary member indirectly attached to the body of the vehicle and lined with frictional material adapted to be brought in contact with the drum for the purpose of causing the drum and vehicle to slow down or stop.

Stationary friction members belong to one of two types; one is known as a flexible band and the other as a rigid shoe. The band is brought into contact with the drum by actually bending the band, which is sufficiently flexible to permit this upon application of loads which are small compared with the maximum load that an operator may apply.

Brake shoes have generally been made as rigid as possible, and are usually pivoted about a point fixed to the body of the vehicle. They are brought in contact with the drum by giving them a slight rotation about their pivot. Both of these types have definite limitations. The band lends itself more readily to application upon the outside of the drum where it is exposed to the elements and accumulates mud and dirt. This, and other reasons have caused engineers to favor internal brakes which may be expanded outwardly toward the drum, rather than external brakes contracted upon the drum.

It is the aim of the present invention to improve internal brakes by materially reducing the number of parts and by simplifying the structure of the various parts entered in the assembly.

An object of the invention is to attain smooth operation of the brake under all conditions, and to avoid abnormal conditions resulting in sensitiveness and grab.

Another object of the invention is to provide a brake shoe possessing greater effectiveness than heretofore attained.

Another object of the invention is to prevent the possibility of the brake making a clicking noise as it is brought into operation.

Another object of the invention is to provide a simplified friction locater in which the location of the shoe is affected by the action of the drum and by friction.

A further object of the invention is to provide a simplified steady rest for retaining the shoes in frictional engagement in the backing plate.

A further object of the invention is to provide a simplified anchor for the shoes.

A further object of the invention is to provide an equal action cam for a brake of the duo servo type, in which either end of the shoe mechanism may be the anchored end and either end the applying end.

Yet, a further object of the invention is to provide a simplified operating means comprising relatively few parts which may be easily and quickly assembled.

A salient feature of the invention is a single and nonadjustable anchor for a plurality of floating shoes of the servo type articulated together by a link.

Another feature of the invention is a comformable shoe as distinguished from a rigid shoe or band.

Another feature of the invention is a one piece cam and operating lever, designed to eliminate cam "kick-back" and to provide equal action between the braking elements.

A further feature of the invention is to provide a control, including an operating cable having a direct pull on the operating lever and means associated therewith, including a ramp, and a novel manner of securing the cable to the backing plate.

Another feature of the invention is a compression spring arranged to provide a suitable steady rest for the shoes.

A further feature of the invention is to provide means including an unbalancing spring preventing the possibility of the brake making a clicking noise as it is brought into operation.

Yet, a further feature of the invention is to provide a friction locater which is self-adjusting, to compensate for the wear of the lining on the shoes.

Other objects and features of the invention will appear from the following description, taken in connection with the drawings, which form a part of this specification, and in which:—

Figure 6 is an enlarged side elevation of one of the brake shoes;

Figure 7 is a sectional view substantially on line 7—7 Figure 1;

Figure 8 is a perspective view of the clip for securing the operating cable to the backing plate; and Figure 9 is a diagrammatic illustration of the equal action cam.

Figure 1:
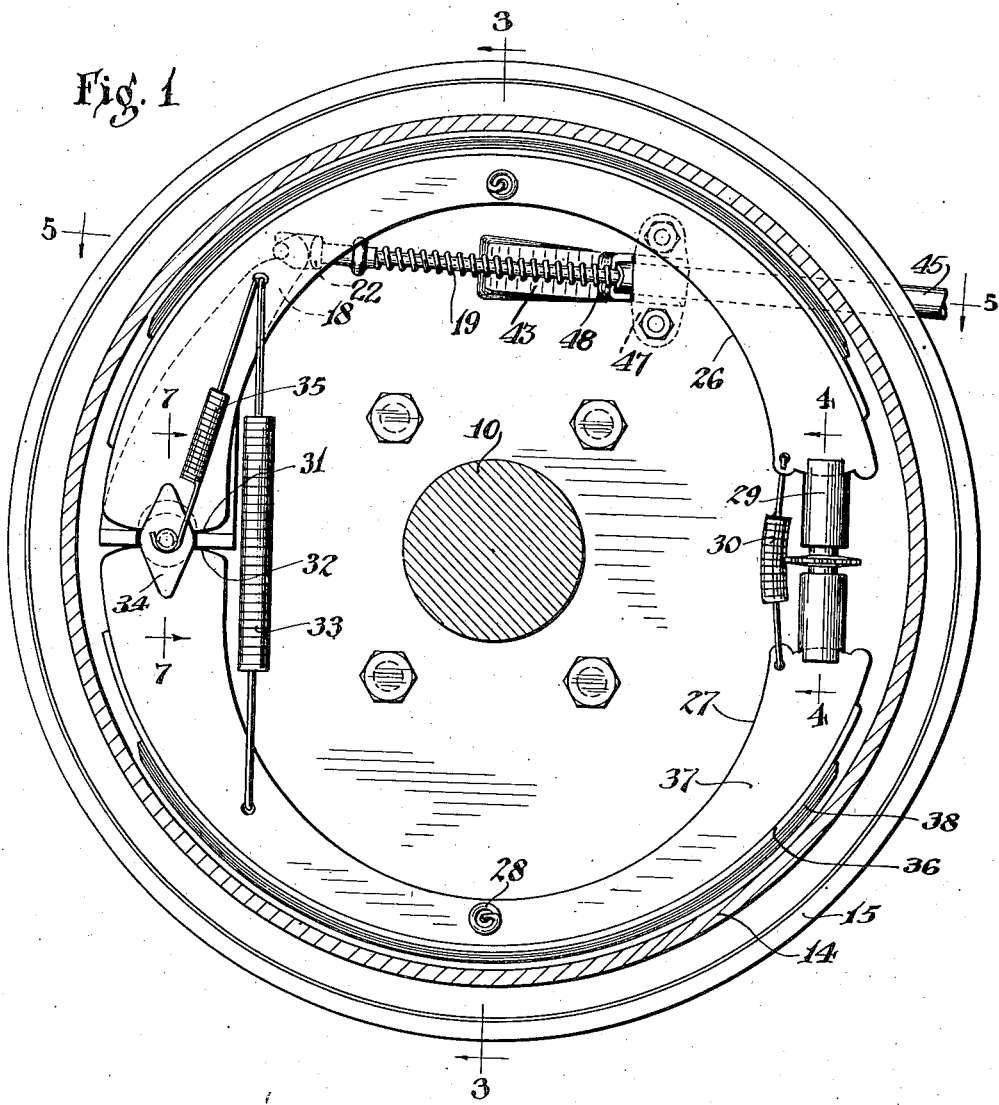
Figure 1 is a side elevation of a brake embodying the invention.
Figure 2:
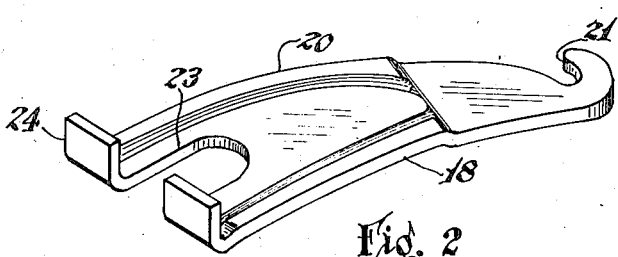
Figure 2 is a perspective view of the combined operating lever cam.
Figure 3:
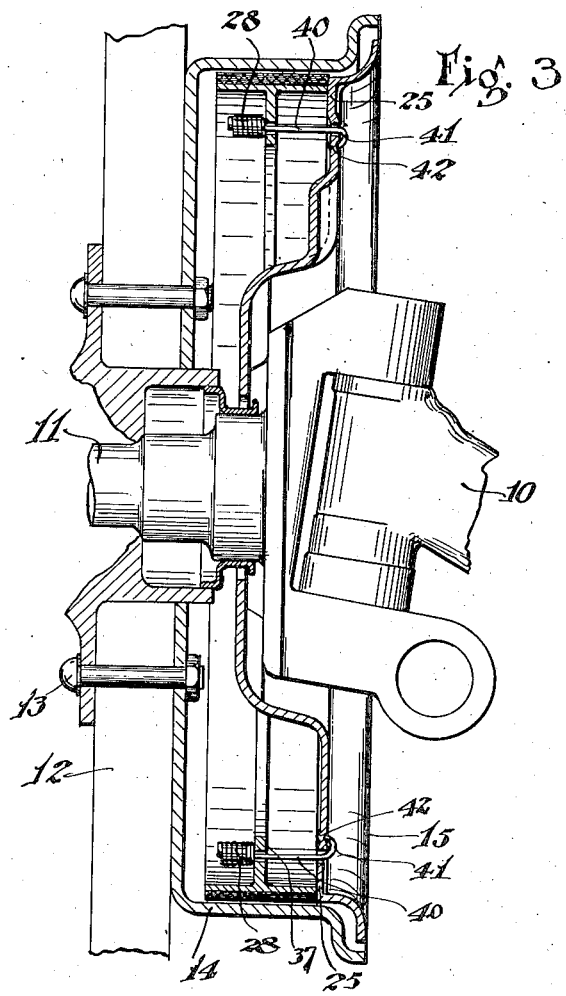
Figure 3 is a sectional view substantially on line 3—3 Figure 1.
Figure 4:
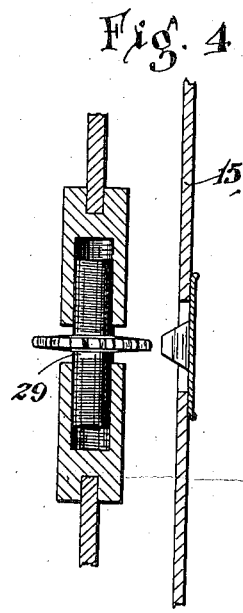
Figure 4 is a sectional view substantially on line 4—4 Figure 1.
Figure 5:
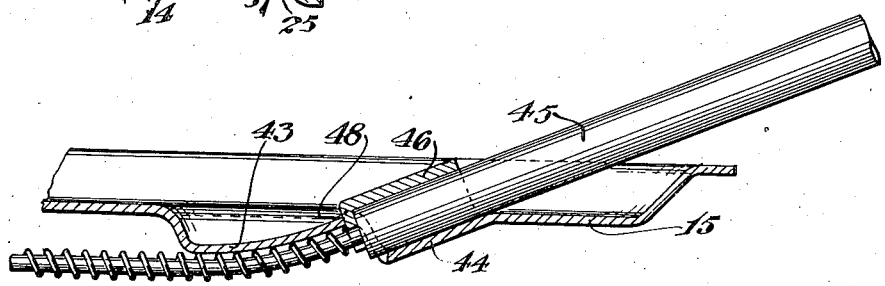
Figure 5 is a sectional view substantially on line 5—5 Figure 1.

Referring to the drawings and more specific details of the invention: 10 represents a motor vehicle axle having positioned thereon a spindle 11 on which is mounted for rotation a wheel 12. The wheel 12 has secured thereto as by bolts 13 a drum 14. Positioned in the open end of the drum 14 is a backing plate 15, suitably secured to a flange on the spindle 11.

Positioned on the backing plate is a single non-adjustable anchor 16. This anchor is one of the salient features of the invention. As shown, the anchor is riveted to the backing plate which is strengthened to take the braking loads by a reinforcing plate 17 spot welded to the backing plate. The resulting anchor possesses great strength and rigidity. It is to be noted that the overhang of the anchor has been materially reduced. This results in a greater reduction in the bending loads imposed upon the backing plates. This structure permits a considerable saving in material over the various types of anchors heretofore employed.

Positioned on the anchor 16 is a one piece operating member 18, suitably connected to a control cable 19 to be hereinafter referred to. The member 18 is mounted for rotation on the anchor 16 and is adapted to move circumferentially on the anchor. As shown, the member comprises an arcuate body portion 20 hereinafter referred to as the lever, having a hook 21 on one end adaptable for engagement by a suitable link 22 secured to the operating cable 19. The other end is bifurcated as indicated at 23 to straddle the anchor 16 and the bifurcated ends are bent at right angles to the body portion to provide a novel cam 24 for spreading the primary and secondary shoes apart.

The backing plate 15 is provided with a plurality of spaced bearing surfaces 25 and positioned on these bearing surfaces are primary and secondary shoes 26 and 27 held in frictional engagement with the bearing surfaces by small compression springs 28 to be hereinafter referred to as steady rests.

As shown, the shoes are adjustably connected at their articulating ends by a suitable adjusting screw 29 and a tension spring 30. The other ends of the shoes are provided with rounded shoulders 31 and 32, adapted to engage the respective sides of the cam 24 formed integral with the lever 20, against which they are normally held by a tension spring 33, commonly referred to as a return spring, connected between the shoes, and a guide plate 34, positioned on the anchor and suitably secured against displacement co-operates with the lever to prevent disalignment of the shoes with the cam.

Connected between the anchor 16 and the secondary shoe is an unbalanced spring 35. This spring is incorporated to prevent the possibility of the brake making a clicking noise as it is brought into operation. To operate the brake, the shoe ends must be spread apart. When this occurs, one or the other or both of them must leave the anchor. As soon as contact occurs between the shoes and the drum, however, the shoes are carried around with the drum until contact occurs with the anchor. This is liable to result in an objectional clicking noise. In the present structure this is eliminated by preventing the shoes from actually leaving the anchor.

The unbalancing spring holds the shoe, to which it is attached, against the anchor and assures that, when the cam moves to spread the shoes apart, it is the other shoe that moves away. When the direction of rotation is such that the spring held shoe is a secondary shoe it remains consistently against the anchor and no click occurs.

When the direction of rotation is such that the spring held shoe is the primary shoe, however, the other shoe moves first, as before, until it comes in contact with the drum. When sufficient friction is established between the drum and shoe to overcome the load of the unbalancing spring, the shoe that moves first returns against the anchor and further movement of the cam causes movement of the spring held shoe. There is no click, however, when the non-spring held shoe returns against the anchor.

This results from the fact that the direction of the shoe movement is not wholly circumferential but only partly so, due to the outward or radial component in the direction of the application of the cam, which causes the shoe end to slide against the anchor outwardly, instead of leaving the anchor tangentially. Upon the shoe making contact with the drum, it then slides back upon the anchor and does so silently.

In a double action brake of the duo servo type, in which either end of the shoe mechanism may be the anchor end and either end the applying end, and in which the cam or operating means is a lever acting to spread the shoe ends apart, the fulcrum of the lever may be the point of contact of the cam with either shoe. The lever has one point upon which the force of application acts and two points of contact, one with each shoe. One of these points being the fulcrum and the other the point of movement.

The cam ratio is the ratio of the distance between the point of application and the fulcrum to the distance between the fulcrum and the point of movement.

Upon referring to Figure 9, it will be observed that the point of application is at the point A. Hence, in "forward" braking, the point B is the fulcrum and C the point of movement, whereas in "reverse" braking, C is the fulcrum and B the point of movement. To obtain equal ratios in both directions, it is necessary for the distance A—B to equal the distance A—C. This is substantially so in the embodiment illustrated.

As shown, the brake shoes 26 and 27 are interchangeable. They comprise a rim 36, a web 37 and a lining 38 adapted to engage the drum. It is to be observed that the web 37 is provided at its articulating end with a notch 39, adapted to receive the adjusting screw 29 and at its shoulder with a notch 40, adapted to engage the anchor 16. The web is gradually reduced in cross-section from its respective ends towards the center, so that the shoe will conform to the radius of the drum.

This structure provides a smoothness in operation not heretofore attained. By partially reducing the rigidity of the shoe, so that while no change in shape occurs until the brake is in full contact or engagement with the drum, the shoe may be flexible under the influence of moderate brake loads to an extent great enough to permit it to conform with the shape of the drum.

Excessive friction, due to local contact, cannot build up, even if local contact occurs initially, before the forces that would occur with such contact with a rigid shoe can build up, the shoe will have flexed a small amount, i. e., a few thousandths of an inch, and this slight change in shape will have brought about full contact between the shoe and the drum without any marked change in the braking load.

The principle may be applied with advantage to shoes that are within a critical length. A full rigid shoe of a given length is safe for a given coefficient of friction. Unfortunately the coefficient of friction is liable to change and if it should increase, the brake is liable to grab. It is, therefore, apparent that the use of the conformable shoe thus protects an otherwise safely designed shoe, from the ill effects from the increased coefficient of friction.

The invention has its greater field for use in permitting the use of shoes of greater length than the critical or fully rigid shoes. Theoretical conditions prohibit the use of shoes of a length greater than 180 degress of arc, practical considerations, notably the necessity of a reasonable amount of clearance at the toe, further reducing this angle to about 165 degrees. The ability to increase the length of the lining beyond the practical limit of 135 degrees is, however, most favorable. The extreme length of lining gives added wear, and hence increases the period for which the brake may be used without relining. Furthermore, it permits the use of a single anchor for a pair of floating shoes or braking elements of the servo type, articulated together as by a link. A connection of the type shown between the shoes can transfer only a thrust directly along its length, hence unless the lining can be carried further towards the link than it is possible at present, a wedging action occurs at the heel of the primary shoe, because there is no support for the component of the thrust normal to the link.

In the present invention, the lining can be carried far enough under the link to prevent this wedge. The conformable shoe also possesses a greater effectiveness than either a rigid shoe or a band covering the same amount of arc. It also materially reduces drum scoring and squeal. Brake shoes generally consist of a flange or rim to which the brake lining is attached, and a web to lend the necessary rigidity. Shoes at present in use either have a very high web or a web of moderate height with a flange at its inner edge to increase its rigidity. Stiffness or rigidity can best be expressed in terms of a moment of inertia, since the deflection of a given load varies inversely as the moment of inertia. The minimum height of a conformable shoe at its center should be from one-fourth to one-half the height of a rigid shoe and should be at least four times the height of a band.

In terms of the drum diameter, the height of the shoe web should be roughly one-sixteenth. Since the shoe is to conform to the drum, rigidity of the drum plays an important part, and a ratio can be established between the proper shoe and drum rigidities. The drum usually has a back portion adapted to be secured to the wheel of a vehicle and the cylindrical portion in proximity to this is naturally very stiff. The outside of the cylinder, however, is the determining factor. It is generally reinforced by a flange which is of necessity less rigid than the inner portion. The proper conformable shoe should have a web height approximately the same as that of the flange of the drum. It may, however, have a slight variation.

A steady rest 28 provides a novel support for the shoes. As shown, the steady rest comprises a compression spring having one end seated on the web of the shoe, and its other end terminating in a stem 40 which passes through the convolution of the spring, through an aperture in the web and thence through an aperture in the backing plate, and the end of the stem is bent in the form of a hook 41 which engages a depression 42 in the backing plate.

This structure provides a very simple and efficient means for retaining the shoes in position on the backing plate. The shoes are held against the backing plate between compression springs, and friction exists at the point of contact between the shoes and backing plates, due to the load of the spring. This friction prevents movement of the shoes on a small load on the brake being released. After application, the main retracting or returning spring holds the shoes against the anchor, while the drum, upon release of the braking load, changes from its distorted to its normal shape and kicks the shoes clear of itself.

In this connection it should be noted that while an unbalancing spring is used, this is so applied that it exerts no movement upon the shoes tending to affect their location.

Positioned on the backing plate 15 is a ramp 43, adapted to support the operating cable 19. As shown, the ramp 43 is swedged from the body of the backing plate and formed adjacent thereto is a semi-cylindrical recess 44, adapted to receive the sheath 45 for the cable 19. The recess 44 is so positioned that it opens above the lower end of the ramp 43 and the sheath 45 is securely in position by a plate 46, bolted or otherwise secured to the backing plate.

As shown, the plate 46 comprises a semi-cylindrical member having flanges 47 by which it may be secured to the backing plate and an end flange 48 adapted to engage the end of the sheath 45. The flange 48 is positioned between the lower edge of the ramp 43 and the extreme inner end of the sheath 45. This structure provides a desirable means for securing the sheath of the cable in a fixed position upon the backing plate.

While preferred embodiments of the invention have been described, it is to be understood that these are merely given as underlying principles of the invention, and since these may be incorporated in other specific mechanical structures, we do not intend to be limited to those shown except as such limitations are clearly imposed by the appended claims. The above-described shoes and operating lever are claimed per se in our divisional applications No. 693,560, filed October 14, 1933, and No. 693,561, filed October 14, 1933. The adjusting means is claimed per se in our divisional application No. 748,482, filed October 16, 1934.

Having thus described the various features of the invention, which we claim and desire to secure by Letters Patent is:—

1. A brake comprising a support, a plurality of shoes positioned on the support and an anchor for the shoes, in combination with an operating lever shiftable with the shoes to permit one or the other of them to engage said anchor and which has thrust parts one on the outer side and the other on the inner side of said anchor radially of the brake, said thrust parts having operative engagement with said shoes respectively.

2. A brake comprising a support, a plurality of shoes positioned on the support and an anchor for the shoes, in combination with an operating lever having one end movable in the space between one shoe and said support and having at its other end thrust parts on opposite sides of said anchor and engaging said shoes respectively.

3. A brake comprising a drum, a support associated therewith to form a substantially closed brake chamber, a plurality of shoes positioned on the support within said closed chamber adaptable for co-operation with the drum, a fixed anchor for the shoes, a floating operating lever arranged in said chamber between the support and one of the shoes and which has thrust parts engaging the ends of said shoes adjacent said anchor, and an operating element passing through the support into said chamber and connected with the end of said lever.

4. A brake comprising a drum, a support associated therewith to form a substantially closed brake chamber, a plurality of shoes on the support, an anchor positioned on the support intermediate the shoes, a floating lever within said chamber between one of the shoes and the support and which operatively engages the shoe ends, a flexible conduit secured at its end to the support and communicating through the support with said closed chamber, and a flexible tension member extending through the conduit into said chamber and connected to the end of said lever.

5. A brake comprising a drum, a support associated therewith to form a substantially closed brake chamber, a plurality of shoes on the support, a fixed anchor positioned on the support between the separable ends of the shoes, a floating lever arranged between one of the shoes and the support and engaging the shoe ends adjacent said anchor, a flexible tension member extending through the support and connected to said lever, and a coil return spring sleeved on said tension member and confined between the lever and the support.

6. A brake comprising a drum, a support associated therewith to form a substantially closed brake chamber, a plurality of shoes positioned within said chamber for movement with respect to the support and adaptable for co-operation with the drum, an anchor positioned on the support intermediate the separable ends of the shoes, a lever having parts engaging the ends of the shoes adjacent and on opposite sides of said anchor and extending alongside one of the shoes away from the anchor, a conduit communicating with said chamber through the support approximately midway of said one shoe; and a tension member extending through the conduit and crossing a portion of said chamber approximately parallel to the drum diameter passing through said anchor and which is connected at its end to the end of the lever.

7. A brake comprising a drum, a backing plate associated therewith, friction means having separable ends and movably supported on the backing plate adaptable for co-operation with the drum, a nonadjustable anchor for said ends, and a floating operating lever unsupported by said plate and arranged beside the friction means wholly in the space between the backing plate and the friction means and having thrust parts projecting between said separable ends.

8. A brake comprising a drum, a backing plate associated therewith, friction means having separable ends and movably positioned on the backing plate and adapted for co-operation with the drum, a single anchor between said ends, and a floating lever between the friction means and backing plate which is formed to clear said anchor and which has laterally-projecting thrust parts engaging said ends.

9. A brake comprising a drum, a backing plate associated therewith, friction means movably positioned on the backing plate adapted to co-operate with the drum, an anchor positioned on the backing plate between said ends, and a floating lever between the friction means and the backing plate and formed to clear said anchor and having spaced laterally-projecting thrust lugs extending between said ends on opposite sides of said anchor.

10. A brake comprising a backing plate, a plurality of shoes positioned for movement on the backing plate, an anchor for the shoes, and a combined cam and lever for operating the shoes, said lever being freely floating and having lugs extending laterally thereof between the ends of the shoes on opposite sides of the anchor and having its main portion arranged beside one of the shoes and extending generally perpendicular to a line through said lugs and having an opening for said anchor such that the anchor does not interfere with the lever floating with the shoes in either direction.

11. A brake comprising a support, a plurality of shoes on the support, a fixed non-adjustable anchor on the support intermediate separable ends of the shoes, and operating means for the shoes arranged beside one of the shoes and approximately perpendicular to the brake radius passing through the anchor and slidably and rotatably positioned on the anchor and having thrust lugs acting on the respective shoes on opposite sides of the anchor.

12. A brake comprising a backing plate, a plurality of shoes on the backing plate, a fixed anchor on the backing plate intermediate the separable ends of the shoes, and a combined lever and cam adapted for circumferential movement in both directions and rotation about an axis in the anchor co-operating with the shoes and having thrust parts operatively engaging said shoes and one of which is radially outside of the anchor and the other of which is radially inside the anchor.

13. A brake comprising a support, articulated members positioned on the support, an anchor post between separable ends of the members, and a cam slidably and rotatably mounted on said post and movable about an axis in the anchor co-operating with the members and having thrust parts operatively engaging said shoes and spaced equally from said axis.

14. A brake comprising a support, friction members having separable ends and positioned for movement on the support, and an operating lever between one of said members and the support and which has at one end integral spaced thrust parts engaging said separable ends and arranged in a line substantially perpendicular to the length of the lever.

15. A brake comprising a support, friction means having adjacent separable ends, a fixed anchor on the support between said separable ends, a spring tensioned between the anchor and said means near one of its ends and insuring that the other of said ends will leave the anchor first when the brake is applied, said spring being located on the side of said means opposite the support, and an operating lever having integral thrust parts between and engaging said separable ends and arranged on opposite sides of said anchor.

16. A brake comprising a support, friction means having adjacent separable ends, a fixed anchor on said support between the separable ends, and a member positioned on the anchor having a shiftable rotatable relation to the anchor and adaptable for engaging said separable ends at points equi-distant from the axis of rotation and cut away between said points to clear the anchor.

17. A brake comprising a support, a shoe on the support and a compression spring engaging the side of the shoe opposite the support and having a part extending through the shoe and connected to the support.

18. A brake comprising a support, shoes on the support and means for retaining the shoes on the support including a compression spring engaging the side of one of the shoes on the side opposite the support and having its end extended through the spring and through the shoe and connected to the support.

19. A brake comprising a support, a plurality of bearing surfaces on the support, a shoe positioned for movement on the bearing surfaces, a compression spring having one end seated on the web of the shoe, a stem on the other end of the spring passing through the convolutions of the spring, through the web and through the backing plate, and a hook on the stem adapted to engage a recess in the backing plate.

20. A brake comprising a backing plate, a plurality of shoes positioned thereon, an anchor intermediate the adjacent ends of the shoes, an operating means adjacent the backing plate slidably and rotatably mounted on the anchor adapted to spread the shoes apart, and a coiled spring connected between the secondary shoe and the anchor and located on the side of the shoe opposite the backing plate and adapted to retain the secondary shoe continuously against the anchor and thus cause the primary shoe to move away from the anchor.

21. A brake comprising a backing plate having a ramp, an operating cable and a sheath therefor and means associated therewith for securing the sheath of the operating cable to the backing plate including a clamp.

22. A brake comprising a backing plate, a ramp formed upon the backing plate, an operating cable and a sheath therefor and means associated with the ramp for securing the sheath of the operating cable to the backing plate, including a clamp adapted to house the end of the sheath.

23. A brake comprising a backing plate, a ramp swedged from the backing plate, the backing plate having a recess swedged thereon adjacent the ramp, an operating cable having a sheath positioned in the recess and a clamp for securing the sheath in position having a semi-cylindrical body embracing the sheath and a flange adapted to engage the end of the sheath.

24. A brake comprising a backing plate, a ramp swedged in the backing plate, a raised portion on the backing plate providing a semi-cylindrical recess adjacent the lower end of the ramp, an operating cable and a sheath therefor, a clamp for securing the sheath in the recess comprising a plate having a semi-cylindrical body portion adapted to embrace the sheath and a flange on the clamp adapted to abut the lower end of the ramp and to provide a support for the end of the sheath.

25. A brake comprising a backing plate, primary and secondary articulated shoes positioned for movement on the backing plate, yielding means for retaining the shoes in frictional engagement with the backing plate, an adjusting member connecting the articulated ends of the shoe, an anchor positioned intermediate the adjacent ends of the shoes at the side of the brake opposite said adjusting members, both shoes having notches in the shoulder ends thereof directly engaging the anchor, a floating rotatable operating lever positioned on the anchor, a cam adjacent the anchor operated by the operating lever substantially unaffected by the anchoring of the shoes and adapted to spread the shoes apart, and an unbalancing spring adapted to retain at least one of the shoes in engagement against the anchor.

26. A brake comprising a rotatable drum, a backing plate associated with the drum, primary and secondary articulated shoes positioned for movement on the backing plate and adapted for co-operation with the drum, yielding means for retaining the shoes on the backing plate, means for adjustably connecting the articulated end of the shoes, an anchor positioned between the shoulder ends of the shoes, a floating rotatable operating lever positioned on the anchor between one shoe and the backing plate, means operated thereby for spreading the shoes apart, a return spring connected between the shoes for normally retaining the shoes in engagement with the single anchor, and means connecting the secondary shoe to the anchor and located on the side of the shoe opposite the backing plate and adapted to retain the secondary shoe in engagement with the anchor when the primary shoe is moved away from the anchor.

27. A brake comprising a backing plate carrying an anchor, friction means formed at its ends with notches embracing said anchor and provided with an adjustment for increasing its effective length to compensate for wear, a return spring for the friction means, applying means acting on said shoes adjacent said anchor and including a lever swinging in a plane beside the backing plate and in a plane between the friction means and the backing plate and which extends generally circumferentially of the brake, actuating means including a flexible conduit arranged exteriorly of the brake and engaging the backing plate, and a cable passing through the conduit and through the backing plate and connected to said lever inside the brake and which extends along a chord of the brake.

28. A brake comprising a backing plate carrying an anchor, a pair of shoes having webs formed at their ends with notches embracing said anchor and having other notches in their other ends, an expansible adjusting device seated at its ends in said other notches and adjustably connecting the shoes, applying means acting on said shoes adjacent said anchor and arranged adjacent the inner face of said backing plate, a flexible tension member connected to said means and extending through the backing plate at an acute angle, and a flexible conduit engaging the backing plate at its end and housing the part of said element outside the brake.

29. A brake comprising a backing plate having an anchor mounted at one side thereof, floating friction means embracing said anchor between its ends, an applying device adjacent said anchor and acting on said ends and including a lever arranged for movement beside the backing plate and in a plane between the friction means plate and the backing plate and which extends generally circumferentially of the brake, and force-transmitting means extending through the backing plate and connected to said part and including a flexible conduit engaging the backing plate and a cable extending through the conduit and through the backing plate and secured to the lever.

30. A brake comprising a support, a plurality of bearing surfaces on the support, a shoe positioned for movement on the bearing surfaces and formed with a web, a compression spring having one end seated on the shoe, a stem connected to the other end of the spring passing through the convolutions of the spring, through the web and through the support, and means on the end of the stem adapted to form a universal connection with the support.

31. A brake comprising a backing plate formed with a recess, a plurality of bearing surfaces on the backing plate, a shoe positioned for movement on the bearing surfaces including a web, a compression spring having one end seated on the web of the shoe, a stem connected to the other end of the spring passing through the convolutions of the spring, through the web and through the backing plate, and means on the stem having rolling engagement with said recess in the backing plate.

32. A brake comprising a single fixed anchor, shoes formed to engage said anchor at their extreme ends at one side of the brake and having a floating expansible connection at the other side of the brake which is adjustable to compensate for wear of the brake, and applying means extending beside one of the shoes and approximately perpendicular to the brake radius passing through the anchor acting on the extreme ends of said shoes on opposite sides of and adjacent said anchor without interfering with the alternate anchorage of one or the other of said shoes in forward or reverse braking.

33. A brake comprising a single fixed anchor, shoes formed to engage said anchor at their extreme ends at one side of the brake and having a floating expansible connection at the other side of the brake which is adjustable to compensate for wear of the brake, and means for applying said shoes without interfering with the alternate anchorage of one or the other of said shoes in forward or reverse braking, said applying means including a part acting on the extreme ends of said shoes on opposite sides of and adjacent said anchor and positioned approximately perpendicular to the brake radius passing through the anchor, and having a portion extending beside one of the shoes.

HUMPHREY F. PARKER.
B. E. HOUSE.